United States Patent
Duro

[19]

[11] Patent Number: 5,951,732
[45] Date of Patent: Sep. 14, 1999

[54] METHOD OF GLASS FORMING

[76] Inventor: Mark Duro, 605 N. Main St., Sandwich, Ill. 60548

[21] Appl. No.: 08/992,018

[22] Filed: Dec. 17, 1997

Related U.S. Application Data

[60] Provisional application No. 60/057,718, Aug. 28, 1997, and provisional application No. 60/060,740, Oct. 2, 1997.

[51] Int. Cl.⁶ .................................................. C03C 19/00
[52] U.S. Cl. ........................ 65/61; 65/63; 65/64; 65/102; 65/105; 65/106; 428/38; 428/426; 428/428
[58] Field of Search .................................. 65/61, 63, 64, 65/102, 105, 106; 428/38, 426, 428

[56] References Cited

U.S. PATENT DOCUMENTS

| | | | |
|---|---|---|---|
| 141,782 | 8/1873 | Frederici | 428/428 |
| 293,636 | 2/1884 | Festetics | 428/428 |
| 1,813,901 | 7/1931 | Bayne. | |
| 2,115,433 | 4/1938 | Soule | 65/61 |
| 2,515,943 | 7/1950 | Stookey | 65/63 |
| 2,651,145 | 9/1953 | Stookey | 65/63 |
| 3,238,031 | 3/1966 | Nikoll | 65/106 |
| 4,091,132 | 5/1978 | Marioni | 428/35 |
| 5,669,951 | 9/1997 | Eichhorn | 65/61 |

FOREIGN PATENT DOCUMENTS

| | | | |
|---|---|---|---|
| 776952 | 11/1934 | France | 428/38 |
| 1000039 | 8/1965 | United Kingdom | 428/38 |

*Primary Examiner*—Peter Chin
*Assistant Examiner*—Michael P. Colaianni
*Attorney, Agent, or Firm*—Lee, Mann, Smith, McWilliams, Sweeny & Ohlson

[57] ABSTRACT

A method of forming glass uses the steps of forming base glass from layered stacks of colored glass; V-Grooving a plurality of base glass layers; stacking the grooved layers; heating and maintaining at an elevated temperature for flow and air entrainment elimination; recutting the block to desired dimensions and reforming into sheet form. The glass has ribbons of color contained within a glass matrix, the ribbons being aligned perpendicularly to the face of the glass.

5 Claims, 3 Drawing Sheets

FIG. 1
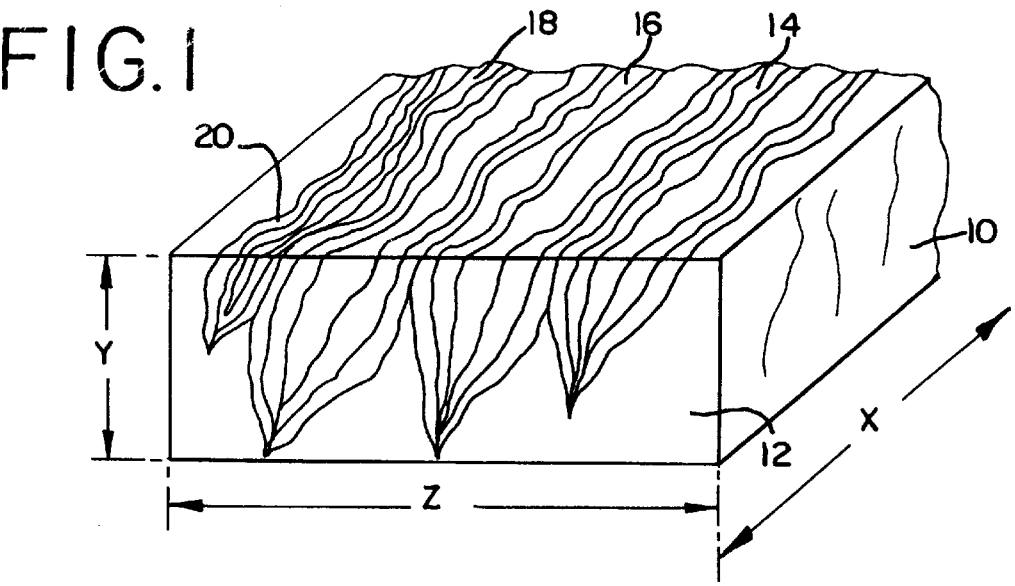
FIG. 2
PRIOR ART
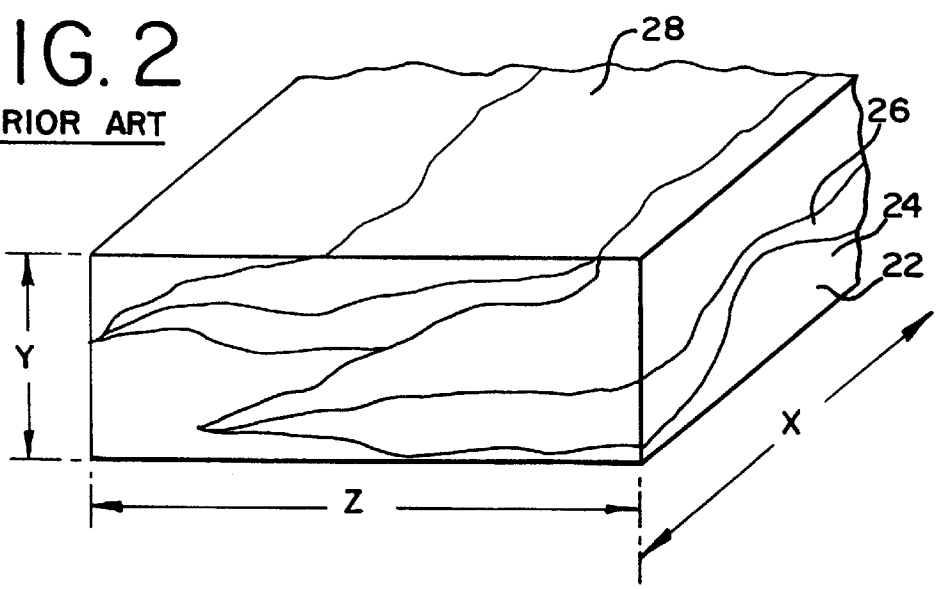
FIG. 3
| STEP 1 | STEP 2 | STEP 3 | STEP 4 | STEP 5 | STEP 6 |
|---|---|---|---|---|---|
| FORM BASE GLASS FROM STACKED LAYERS OF COLORED GLASS | V-GROOVING  ALTENATIVE: BARS CUT ON DIAGONAL | STACK GROOVED BLOCKS IN MOLD | HEAT TO 1650°- 1770° F | CUT THE BLOCK TO FORM | REFORM AS SHEET AND REHEAT |

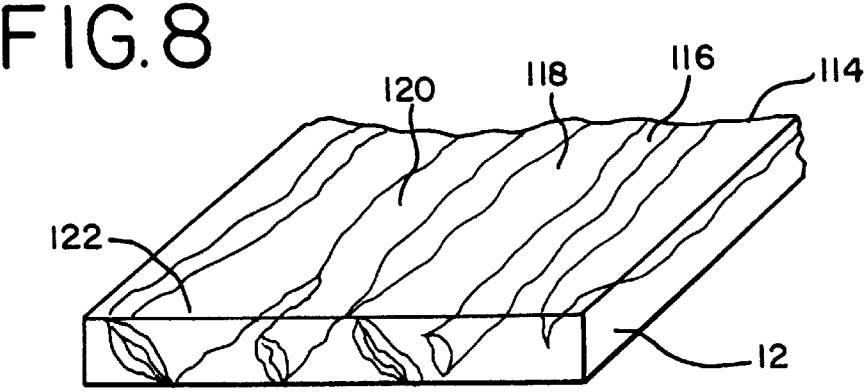
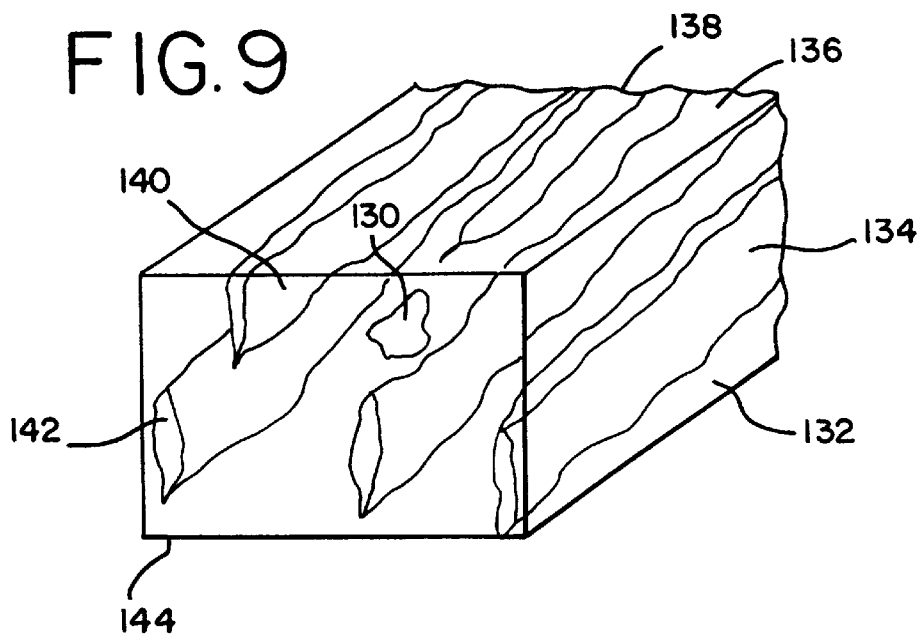
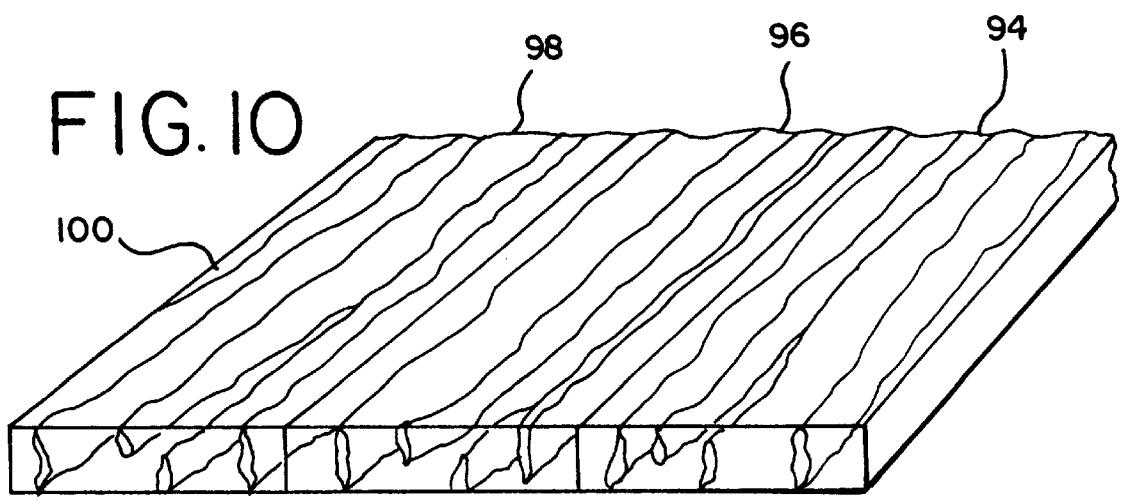

METHOD OF GLASS FORMING

CLAIM OF PRIORITY

Applicant claims priority of his previously filed two provisional patent applications, the first being Ser. No. 60/057,718, filed Aug. 28, 1997; and the second being Ser. No. 60/060,740 filed Oct. 2, 1997.

BACKGROUND OF THE INVENTION

DESCRIPTION OF RELATED ART

The prior art for stained glass includes long known hand processes and variations using automated counterparts. Typically, the making of stained glass involves a first glass constituent in molten state with second, third, or more constituents also in molten state, physically being ladled or poured into the first constituent. A thus combined pool of molten glass is then stirred or mixed to a desired density, the constituents remaining somewhat separate for a desirable end product of superior a esthetic properties, although totally uniform stained glass may well also be formable. The thus mixed pool is then fed through a roller appropriately extruding it into sheet glass form and thence cooled to form a glass sheet. The sheet can then be appropriately cut, polished, or the like.

A trait inherent in the aforementioned prior art, and all known stained glass to date, is that the ribbons of coloration formed in the resultant glass plate are all parallel to the direction of extrusion. It will be understood that the glass sheet has an X-axis representing the length of the extruded sheet, a Y-axis representing the thickness of the glass, and a Z-axis representing the width of the resultant sheet. The sheet is thus described in a horizontal position relative to its manufacture as compared to its position when put in place in, for example, a window. Thus, the ribbons will generally always run parallel to the X-axis and the Z-axis, and will result in a glass panel substantially, entirely translucent.

BRIEF DESCRIPTION OF THE PREFERRED EMBODIMENT

This invention uses a combination of novel steps to form glass in block or sheet form. The glass, particularly from the block, can be adapted to subsequent forming as uniquely shaped members, such as beads or crystal-like shapes closely simulating a variety of precious stones, such as agate. The glass so formed retains its novel banding properties even when reheated and formed into three-dimensional shapes, such as through glass blowing.

The glass produced in accordance with the method is noted primarily for containing narrow color bands rather than the broad, always horizontal ribbons of the prior art. These bands can be controlled as to direction of orientation, color, shape and density of bands relative to clear glass, and produce a substantially bubble-free glass.

The method generally comprises the steps of stacking layers of colored and clear glass in a mold and firing same to flow together; grooving or cutting the block so formed to expose selected color bands; stacking V-grooved blocks, or diagonally cut bars, horizontally in a mold and heating to a high temperature, higher than the normal working temperatures for stained glass forming; maintaining the high temperature for an extended period, allowing trapped or entrained air to escape; and thence forming the block in subsequent steps including forming into bead or crystal shapes; forming into blocks, slugs, or bars useable in glass blowing, or forming into sheet glass. The sheet glass step involves slicing into bars in a selected direction which may be normal to or at an angle to the selected axis of the block effectively exposing a "grain" in a manner analogous to quarter sawn or other sawing techniques for wood; arranging the bars or strips side-by-side in a kiln; positioning the strips tightly together, grinding the edges if necessary; fusing the strips together to form a single glass sheet; marvering the thus formed sheet to uniform thickness and smooth surface; annealing and, if necessary, fire polishing the glass.

The glass made in accordance with this colored glass process is different from standard stained glass or colored glass manufacturing processes. The color in the glass is present in ribbons of a relatively narrow dimension, and can even be discontinuous along the length of the glass. These ribbons are further adaptable to be arranged in a perpendicular, rather than parallel, orientation relative to the surface of the glass. In this way the ribbons can be generally parallel to the X and Y axes, being perpendicular to the Z axis.

BRIEF DESCRIPTION OF THE DRAWINGS

The following drawings, in which like reference characters indicate like parts, are illustrative of embodiments of the invention and are not intended to limit the scope of the invention in any manner whatsoever, as encompassed by the claims forming a part hereof FIG. 1 is a diagrammatic perspective view of a segment of glass produced pursuant to the method.

FIG. 2 is a diagrammatic perspective view of prior art glass.

FIG. 3 is a flow chart showing the method.

FIG. 8 is a perspective view of a quarter sawn slice made according to the invention.

FIG. 9 is a perspective view of a block with a geode inclusion made according to the invention.

FIG. 10 a perspective view of a sheet of glass made according to the invention.

DETAILED DESCRIPTION OF THE PREFERRED EMBODIMENT

Figure 4:
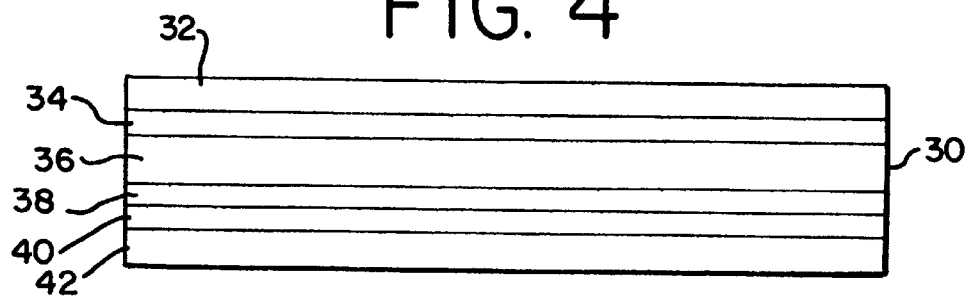
FIG. 4 is a front elevation of the base glass block.
Figure 5:
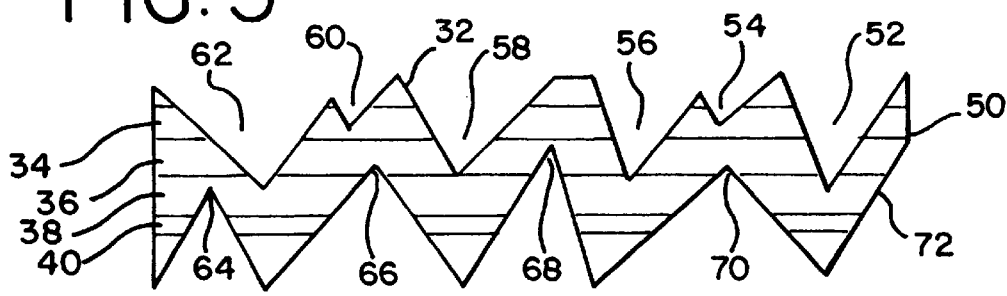
FIG. 5 is a front elevation of a segment of one of a plurality of V-grooved blocks.

FIG. 1 shows a finished glass block 10 having X, Y, and Z axes. A dominant glass matrix 12 contains a plurality of ribbons 14, 16, 18, and 20. As an example, matrix 12 may be clear glass, or it may be colored transparent, or translucent glass. Ribbons 14, 16, 18, or 20 can be made of complimentary colors, contrasting colors, or one or more of them of clear glass when matrix 12 is of colored glass. As illustrated in this example, ribbon 14 does not extend the entire distance of the Y axis, while ribbon 20 extends less than the entire distance of the X axis, and also less than the entire distance of the Y axis. As such, any or all of the ribbons which may also number more or fewer than the four illustrated in this diagram, the relative dimensions of the ribbons can be controlled through use of the method described below to provide extremely unique, novel, and unexpected appearance of glass. In particular, the combination of clear or transparent colored glass provides for excellent transmission of light passing through in the Y axis direction.

FIG. 2 shows a diagram of prior art stained glass. It will be seen that the resulting block of glass 22 includes matrix 24 with wide, horizontal ribbons 26, 28 which extend parallel to both the Z axis and the X axis because the stained glass in its molten state is extruded in the direction of the X axis. The compression of the extrusion dies tends to flatten in the Z axis. Accordingly, light transmission through sheet or block 22, once the sheet or block has been reoriented in the direction typical of a window, will result in illumination much different than the glass of the invention as diagrammed in FIG. 1. In the prior art, light will typically pass perpendicular to the ribbons, and the ribbons will be overlapped and generally merely vary the light transmission slightly. In the invention, on the other hand, dramatic differences in light transmission are possible because of the greater level of control of the ribbons in beginning, ending, orientation, size and density.

FIG. 3 illustrates the steps in the preferred embodiment including one major alternative step in the second step, and the optional step 6 which is only needed if large sheets or plates for windows or the like are to be produced.

The first step in the process is to form the base glass block 30. The base glass block is formed by stacking layers 32, 34, 36, 38, 40, and 42 of COE compatible colored and clear glass in a mold (not shown). These are preferably in multiple stacks, spaced from one another in the mold or receptacle. The stacked layers 32–40 are then fired so that the glass will flow, creating bands of color in a solid block of glass 30. The bands can be thin or thick. The desired thickness of the banding is determined by the thickness of the original glass used and the density of the stacks relative to the limits of the size of the receptacle or mold.

The choice of thin or thick layers will depend on the ultimate use of the glass, for example sheet glass would have wider bands of color due to a greater viewing distance. A controlling factor in the thickness of the layers 32–42 is the spacing between the stacks. Varying spacing changes the horizontal distance flowed when the glass is liquified. A longer flow distance will make a given volume of glass thinner. Another property affected by stacking arrangements is presence of curving patterns resulting from vertical changes in flow direction as stacks liquify and flow. Curving patterns will be formed as both stack height reduces and as flow vortices form.

The overall block thickness after firing should preferably be between three-quarter inch (¾") and two inches (2") when formed by hand. Depending on the proportions of the dimensions usable in larger operations and in semi-automated operations, larger dimensions could be used. Varying block thickness will add aesthetic interest to the finished product.

Other variations permit the stacks to be arranged in just about any way. They can even be lain on their side. Each arrangement will result in a slightly different banding.

The temperature range used for firing to form the base glass is 1625° F. to 1765° F. This is elevated relative to the temperatures used in the prior art for the making of stained glass.

The second step in the method is that of V-Grooving. The ultimate shape of the V-grooved block 50 will preferably be of random V-shaped grooves 52, 54, 56, 58, 60, 62, 64, 66, 68, 70, and 72 to result in serrations on both the top and bottom of the block, roughly analogous to an extended series of letters "W". The V-grooves are preferably cut using a diamond wheel. The diamond wheel cuts into the glass to expose the different layers of color formed in the preceding step. The V-grooves 52–72 are cut on both sides of the block 50. It is preferable to cut most, or all of the V-grooves 52–72 past the midpoint of the block. The more random the depth of the grooves 52–72, the more the finished glass will resemble natural agate in appearance.

Figure 6:
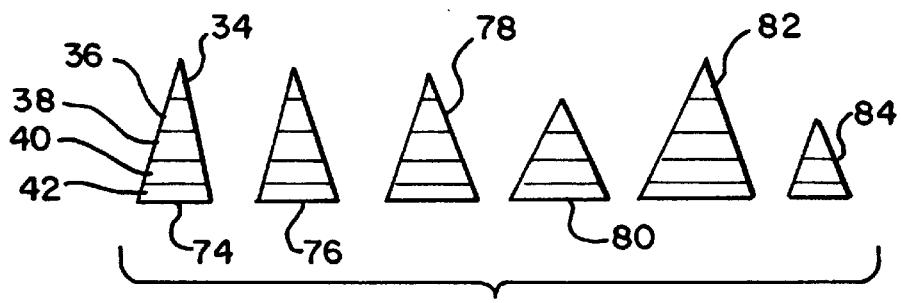
FIG. 6 is an elevational view of an alternative embodiment to the V-grooving step using bars cut on a diagonal.

An alternative embodiment is shown in FIG. 6. This would achieve somewhat similar results. This alternative is to cut bars 74, 76, 78, 80, 82, and 84 of different colored and clear glass on a diagonal. The sectional shape of these bars 74–84 would then be trapezoidal or triangular. The bars 74–84 can then be stacked together in the next step.

The arrangement of layers, in particular their number and proportion, and the number and configuration of the V-grooves described above, all are expected to vary from that shown for maximum aesthetic variation. Further, as described herein, more or fewer, thicker or thinner layers can be put to more advantage depending on the ultimate use of the glass. Aesthetic advantages can thus be obtained by variations enabled by hand forming, precise control of layers, colors, temperature and time, as well as precise control of the geometry of the V-grooves. The artist can therefore produce specific desired effects with consistency.

A separate advantage is also provided by this method. The precise control of layers, colors, temperature and time, and of the geometry of the V-grooves also enables a high level of repeatability. Thus, the artist could use this repeatability to advantage both for the effect and to enable control over the scale of a project, such as making large sized sheets with repetitive patterns.

Repeatability would also enable uniform glass adaptable to automated mass production. While having lesser aesthetic value such an automated product could, nevertheless provide much greater desirability when compared to the prior art.

Figure 7:
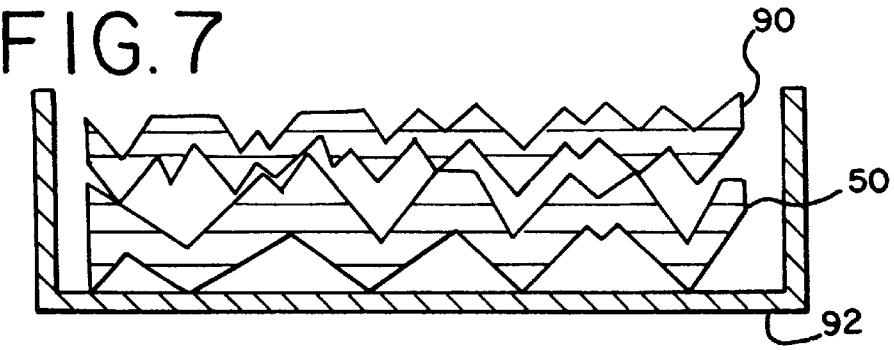
FIG. 7 is a sectional view of segments of V-grooved blocks stacked in a mold.

The third step is stacking the blocks 50, 90 of V-grooved or diagonally cut bars of glass horizontally in a mold 92. A plurality of blocks or layers of cut bars would be used. Preferably about six to eight V-grooved blocks 50 and 90 will be stacked. Only two of these are shown in FIG. 7.

The mold should be five percent (5%) to twenty percent (20%) larger than the size of the glass. This will allow the glass to stretch slightly, softening the line where the blocks meet. If the alternative of using diagonally cut bars is used, an advantage can be obtained by arranging the bars so that the layers of color are not all horizontal to each other.

Another alternative is to add non-glass blocks, fragments or particulates at this point. Adding of a material having a melting point significantly different than that of glass will result in an embedded segment which will appear in the finished glass block as a nugget or "geode window." These materials can be metals, alloys, ceramics or mineral having metal like appearance. These materials can be randomly placed in the grooves between the blocks.

The heating step requires heating the glass to between 1650° F. and 1770° F. The glass is to be held at this temperature for between about thirty (30) minutes to one (1) hour. In this step the cut blocks will liquefy, flow and reform to create thin ribbons of different colored glass within a solidifyable glass matrix. Maintaining this elevated temperature for this extended period of time will both enable free flowing to equilibrium and allow enough time for any trapped air to escape.

The fifth step is to cut the block to appropriate shapes for use, or for reprocessing. Cutting of the glass is best accomplished with a diamond saw. The glass can be cut to any thickness depending on its final use. Typical dimensions are one-half inch (½"), three-eights inch (⅜"), or one-quarter inch (¼") for sheet glass, one-eighth inch (⅛") for stained glass and one inch (1") or thicker for bead stock.

Because of the unique properties of the blending of the ribbons of the colored glass, as well as the possibilities of inclusion of geode windows, mineral or metal particulates, and the like a very broad range of uniquely appearing objects may be created. For example, the appearance reminiscent of the stone agate, enables the forming of beads appearing like semi-precious stones. Selection of appropriate glass colors can result in simulating a variety of stones such as agate, opal or the like.

The glass is readily adaptable for use as traditional art glass, such as stained glass used in decorative windows or items. Cutting and reforming to thicknesses more appropriate to architectural plate glass dimensions enables the forming of architectural glass windows of great interest and aesthetic beauty, also having desirable light transmission properties.

Solid prism shapes, usable for a variety of items and objects d'art can also be formed. This is particularly desirable to display appropriate "geode windows" or nuggets of metal or metal appearing mineral particulates.

It is preferable to cut perpendicular to the grain of the glass, as defined by the formed ribbons. Cutting the glass in other directions and angles will yield different results. For example, principles of defining grains in lumber cut from wood, such as "quarter sawn" lumber can be applied for a desired effect.

The glass can alternatively be reformed as sheet glass, including art glass and plate glass dimensioned architectural glass. This sixth step involves forming sheet glass. Generally depending on the thickness of slices formed in accordance with the preceding step, thin sheet for use as stained glass, or thicker sheet to plate glass dimensions can be formed. The main limiting factor is the size of the available kiln.

Making sheet glass is accomplished by arranging the strips side by side in a kiln. These strips are preferably sliced from the resultant block in the preceding step, typically sliced vertically in that step, and rotated to the horizontal for the sheet making step. In this way, the color ribbons will actually be oriented vertically, that is perpendicular to the face of a horizontal sheet of glass. When the sheet glass is put in place in an installation such as a window, this axis of the ribbons will then be generally parallel to the direction of light passage through the window for a much different light transmission than the wide, "horizontal" ribbons of traditional, prior art, stained glass.

In the sheet making step it is important that the strips be pressed tightly together with no air gap in between them. In order to accomplish this, it may be necessary to grind the adjacent edges. Upon acceptable arrangement the group of strips will then be heated to fusing temperature, within the temperature ranges described in the first step.

Next the person of ordinary skill will marver the sheet to produce a uniform thickness with a smooth surface. Other steps which are contemplated are to anneal the glass, and to fire polish the back side of the resulting sheet, as necessary.

EXAMPLE 1

A description of various examples, within the parameters discussed above, will illustrate the invention. In step 1 above, forming the base sheet, the firing temperature will be about 1725° F. The practitioner will cut four two and one-half inch (2½") squares of COE compatible colored and clear stained glass. The colors will be arranged in the desired sequence of banding. The use of a substantial volume of clear glass to help define the color bands.

The four (4) stacks of two and one-half inch (2½") squares will be made to a height of about two and one-half (2½") tall. These stacks will be placed approximately one inch (1") apart in the center of a ten inch (10") square mold. The sides of the mold should be about one and three-quarter inch (1¾") tall. The glass will then be heated to 1725° F. This step will create a block ten inches (10") by ten inches (10"), approximately one inch (1") thick.

V-grooving, in this example, is the preferred process of as described above. V-grooves are cut with a diamond wheel to expose the different layers of color, being cut on both sides of the block. Most of the V-grooves pass deeper than the midpoint of the block.

Practicing the third step, the practitioner will stack the blocks of V-grooved or diagonally cut bars of glass horizontally in a mold. The preferred stacking is in a ten and one-half inch (10½") by ten and one-half inch (10½") mold. The preferred temperature should be 1725° F. and this temperature should be held for forty-five (45) minutes.

Once the completed glass is formed in a block by the third step it is ready for use, sale or further processing as desired. Polished or unpolished and sold as a block, it will have the ability to be cut and processed in whatever shape the purchaser desires. It will be more preferable for the practitioner to form smaller blocks, slices or sheets to take advantage of the level of control over ribbon forming provided by the earlier steps and the accompanying suitability for cutting to various sizes and shapes such as bead stock, polished blocks for revealing geode inclusions or slices for sheet forming.

EXAMPLE 2

In step 1, for sheet glass, a wider band is necessary as the viewing distance is greater. All that is necessary to achieve this at this stage is to cut ten inch (10") by ten inch (10") pieces of glass and fuse them together in the ten inch (10") by ten inch (10") mold. Do not stack them more than one and one-quarter inch (1¼") tall.

The step of cutting slices from the block with a diamond saw for later reforming as sheet glass is preferably done by slicing in consistent thicknesses, at an angle of 90 degrees relative to the flat portion of the block as formed. In this way the gradual variations in the ribbon will be exposed, but the slices will have consistency from slice to slice, having been cut from adjacent portions of the block.

The sheet glass, is formed as described above in the detailed description. The strips 94, 96, and 98 are placed side by side in a kiln, pressed tightly together with no air gap in between them. If necessary the practitioner will grind the adjacent edges. The strips will then be heated to fusing temperature, within the ranges described in the first step. A sheet 100 of uniform thickness with a smooth surface will be formed by marvering and/or annealing. The practitioner may fire polish the back side of the sheet.

EXAMPLE 3

Quarter sawn glass can be made with certain modifications in the steps. FIG. 8 shows a diagram of this example. Steps one through four can be substantially as described above. Step five, that of forming the slices is accomplished by rotating the cutter blade so that slices are made at about 45 degrees rather than 90 degrees. Other angles could also be used.

It will be seen in the quarter sawn version in FIG. 8 that the matrix 12 now has ribbons 114, 116, 118, 120, and 122 at an angle relative to the X and Y axes.

In step six, it will be noted that it has generally been stated that the strips should be pressed tightly together. In the quarter sawn slices, it will be necessary to grind the adjacent edges. In addition, the strips could either be recut so as to be of uniform width, or the strips of varying width—those taken from the corners of the block—arranged for advantage. Fusing and finishing will be accomplished as described above.

EXAMPLE 4

A geode inclusion 130 is shown in FIG. 9. This can be formed in several manners. A first manner is to simply apply the particulate, material or other manner in selected V-grooves in step three. In this manner, small geode windows or inclusions may be formed. These may be best suited for glass intended to be ultimately fairly thin, as sheet for stained glass, for example.

A second manner is to form, in a separate step, a larger geode inclusion in an independent layer of clear glass. This can be accomplished by sandwiching a large, non-glass "geode" between layers of clear glass, melting and fusing same into a layer, and then including that layer, or a slice therefrom, between V-grooved layers or bars, in step three.

The remainder of steps can be accomplished as described above. In accordance with the desired ultimate use, appropriate geometry and/or slice dimension can be selected in step 5, commensurate with the size of the geode inclusion 130 or geode window.

In FIG. 9, it is shown through illustration that block 132 is proportionally thicker and contains proportionally narrower ribbons 134, 136, 138, 140, and 142, also having a lesser ribbon density in matrix 144. This enables more advantageous display of geode inclusion 130 formed using one of the two manners of forming described above.

Various features of the invention have been particularly shown and described in connection with the illustrated embodiments of the invention, however, it must be understood that these particular arrangements merely illustrate, and that the invention is to be given its fullest interpretation within the terms of the appended claims.

In accordance with my invention I claim:

1. A method of forming stained glass block comprising the steps of:

forming base glass from a plurality of layered stacks of colored and clear glass;

V-Grooving a plurality of base glass layers;

stacking the grooved layers in a mold; and, heating and maintaining said glass at an elevated temperature to provide flow of said glass to form vertical ribbons of colored or clear glass in said glass block and eliminate entrained air.

2. The method of claim 1 including recutting the block to desired dimensions.

3. The method of claim 2 including reforming the block into sheet form.

4. The method of claim 1 wherein said glass is heated to between about 1650° and 1770° Fahrenheit for from about thirty (30) minutes to one (1) hour.

5. A method of forming stained glass block comprising the steps of forming base glass from a plurality of layered stacks of colored and clear glass;

grooving a plurality of base glass layers;

stacking the grooved layers in a mold whereby spaces are defined between at least some of said layers;

said space including material to be included in finished glass;

heating and maintaining said glass at an elevated temperature to provide flow of said glass to form vertical ribbons of colored or clear glass in said glass block including said material.

* * * * *